United States Patent
DeLuca et al.

(12) 
(10) Patent No.: US 11,587,021 B2
(45) Date of Patent: Feb. 21, 2023

(54) ALTERNATE TRANSACTION RETURN PROMOTION OPPORTUNITY

(71) Applicant: International Business Machines Corporation, Armonk, NY (US)

(72) Inventors: Lisa Seacat DeLuca, Bozeman, MT (US); Jeremy R. Fox, Georgetown, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/952,424

(22) Filed: Nov. 19, 2020

(65) Prior Publication Data

US 2022/0156691 A1 May 19, 2022

(51) Int. Cl.
*G06Q 30/00* (2012.01)
*G06Q 10/0837* (2023.01)
(Continued)

(52) U.S. Cl.
CPC ......... *G06Q 10/0837* (2013.01); *G06N 20/00* (2019.01); *G06Q 30/016* (2013.01);
(Continued)

(58) Field of Classification Search
CPC ........... G06Q 10/0837; G06Q 30/0201; G06Q 30/016; G06Q 50/01
See application file for complete search history.

(56) References Cited

U.S. PATENT DOCUMENTS 8,706,647 B2   4/2014   Pathak
9,824,404 B2  11/2017   Astore
(Continued)

FOREIGN PATENT DOCUMENTS

WO   2014145816 W   9/2014

OTHER PUBLICATIONS

Method and System for Anticipating a Product Return Based on Cognitive Learning An IP.com Prior Art Database Technical Disclosure Authors et. al.: Disclosed Anonymously (Year: 2018).*
(Continued)

*Primary Examiner* — Sun M Li
(74) *Attorney, Agent, or Firm* — David K. Mattheis; Maeve Carpenter (57) ABSTRACT

An intent to return a product from a recipient that includes information about the product is received. An optimal social media influencer is selected from a plurality of social media influencers, based on the product information and the location of the product recipient, and information and location associated with respective influencers of the plurality of social media influencers. An agreement document is sent to the selected optimal social media influencer, and the agreement includes terms for the influencer to provide a posting of an activity associated with the product on a social media platform. In response to receiving a response accepting the agreement document, delivery information that includes a destination associated with the selected social media influencer is generated, and the delivery information associated with the selected optimal social media influencer is sent to the recipient of the product from which a shipping label can be printed.

20 Claims, 3 Drawing Sheets

(51) Int. Cl.
*G06Q 30/016* (2023.01)
*G06Q 30/0201* (2023.01)
*G06N 20/00* (2019.01)
*G06Q 50/00* (2012.01)
*G06Q 30/0282* (2023.01)

(52) U.S. Cl.
CPC ..... *G06Q 30/0201* (2013.01); *G06Q 30/0282* (2013.01); *G06Q 50/01* (2013.01)

(56) References Cited

U.S. PATENT DOCUMENTS

| | | | |
|---|---|---|---|
| 9,996,860 B2 | 6/2018 | Saura | |
| 2007/0112647 A1* | 5/2007 | Borders | G06Q 30/016 705/26.81 |
| 2010/0318611 A1* | 12/2010 | Curtin | G06Q 50/01 707/769 |
| 2014/0257921 A1 | 9/2014 | Bear | |
| 2014/0337141 A1 | 11/2014 | Ghosh | |
| 2015/0066795 A1* | 3/2015 | Gillen | G06Q 10/083 705/330 |
| 2015/0112778 A1* | 4/2015 | Feldman | G06Q 30/0269 705/14.16 |
| 2015/0120717 A1* | 4/2015 | Kim | G06F 16/335 707/727 |
| 2017/0364860 A1* | 12/2017 | Wilkinson | G06Q 10/0837 |
| 2019/0050911 A1 | 2/2019 | Fuller | |
| 2020/0013083 A1 | 1/2020 | Narayanam | |
| 2020/0134651 A1 | 4/2020 | Perry | |
| 2021/0012281 A1* | 1/2021 | Paquin | G06Q 10/0837 |
| 2021/0166243 A1* | 6/2021 | Kentris | G06Q 30/0635 |
| 2021/0166293 A1* | 6/2021 | Kentris | G06Q 10/0838 |

OTHER PUBLICATIONS

V. Satyanarayana, S. Shankar, V. Sruthi and B. Das, "A Study of Artificial Social Intelligence in Conversational Agents," 2018 3rd International Conference on Inventive Computation Technologies (ICICT), 2018, pp. 545-550, doi: 10.1109/ICICT43934.2018. 9034313. (Year: 2018).*

G. Gupta and P. Gupta, "Twitter Mining for Sentiment Analysis in Tourism Industry," 2019 Third World Conference on Smart Trends in Systems Security and Sustainablity (WorldS4), 2019, pp. 302-306, doi: 10.1109/WorldS4.2019.8903940. (Year: 2019).*

Brown, "6 Types of Influencers (Mega, Macro, Micro, Advocates, Referrers, Loyalists)", Sensei Marketing, Jun. 26, 2019, 12 pps., <https://senseimarketing.com/6-types-of-influencers/>.

Henrard, "25 Beauty Instagram Micro-Influencers to Follow in 2020", Posted on Jul. 9, 2020, 56 pps., upfluence, <https://www.upfluence.com/influencer-marketing/25-beauty-instagram-micro-influencers-to-follow-in-2019>.

Orendorff, "The Plague of Ecommerce Return Rates and How to Maintain Profitability", 37 pps, Feb. 27, 2019, <https://www.shopify.com/enterprise/ecommerce-returns>.

Rice, "How to approach influencers to promote your eCommerce products", Oct. 14, 2020, 10 pps., <https://jilt.com/blog/how-to-approach-influencers/>.

* cited by examiner

ALTERNATE TRANSACTION RETURN PROMOTION OPPORTUNITY

FIELD OF THE INVENTION

The present invention relates generally to the field of online commerce, and more particularly to creating promotional opportunities based on alternate handling of product returns.

BACKGROUND OF THE INVENTION

Social media users that post or publish information and opinion and who have a large audience of followers across a social media platform are often referred to as social media influencers. A social media influencer may educate and/or persuade followers regarding a particular field, such as an industry, a social or environmental cause, a philosophical position, or educational functions. In some cases, a social media influencer may provide a service that shares first-hand experience and insights associated with products available from retail providers.

Social media influencers may provide detailed information about a particular product in a review posted or published on the social media platform. The review may include details of product packaging, instructions, operations, and how well it complies with advertised information from the manufacturer, which may be very valuable to users purchasing products online. Social media influencers often have experience or expertise in a particular area, field, or product type, and can provide additional information to potential buyers and indirectly help promote products with positive reviews posted on a social media platform, or direct potential buyers away from products with unfavorable reviews.

Online purchasing sometimes involves situations in which a purchased product is returned. Product returns often present additional logistics and activity to maintain consumer satisfaction.

SUMMARY

Embodiments of the present invention disclose a method, computer program product, and system for re-directing a product return. The method provides for one or more processors to receive an intent to return a product from a recipient of the product, including information about the product. One or more processors select a social media influencer, from a plurality of social media influencers, based on the information about the product and the location of the recipient of the product, and information associated with respective influencers of the plurality of social media influencers. The one or more processors send an agreement document to the optimal social media influencer that is selected, wherein the agreement document includes terms of the optimal social media influencer providing a posting of an activity associated with the product on a social media platform. In response to receiving a response accepting the agreement document, the one or more processors generate delivery information that includes a destination associated with the selected social media influencer, and the one or more processors send the delivery information associated with the selected social media influencer to the recipient of the product.

DETAILED DESCRIPTION

Embodiments of the present invention recognize that e-commerce transactions provide convenience to customers and expand sales opportunities for sellers. Both customer and seller deal with shipping costs and logistics which have improved in most cases in delivery time and costs. Embodiments also recognize that e-commerce product returns present challenges to retail businesses, including additional logistics, labor, shipping, and handling activity, along with their respective costs. The dichotomy of the situation e-commerce businesses face is that customers strongly favor "free return policies", which tends to support increase purchases, however, the costs of returns become the burden of the e-commerce business in addition to the loss of sales revenue of the purchase.

Embodiments of the present invention also recognize that some marketing strategies include pushing products to individuals that have demonstrated a level of persuasion and influence over social media follower populations. The pushing of products to the individuals, sometimes referred to as "influencers", is intended to result in some form of a review of the product and, hopefully, one that positively promotes the product. The influencer is often rewarded by performing and publishing (also referred to as "posting), information associated with the product, including operation, quality, ergonomics, ease of use, and other attributes of the product.

Embodiments of the present invention provide a method, computer program product, and computer system for an alternative to existing practices of product returns. Embodiments of the present invention determine an optimal influencer to receive a product intended for return and perform a product assessment or review to providing a promotional opportunity for the product as an alternative to returning the product to the selling e-commerce business. In some embodiments, the optimal influencer is determined based on the brand, product type, product model, location of the product to be returned, the influencer's area of expertise, the number of followers of the influencer, and the purchasing record associated with reviews by the influencer.

In embodiments of the present invention, machine learning techniques are applied to identify and evaluate existing online influencers. In some embodiments, the machine learning techniques may identify and categorize the influencers based on their respective number of followers. The machine learning techniques may include analyzing the content of the postings authored by the influencer to determine areas of perceived expertise, trust, and loyalty by the followers. The machine learning techniques can also be applied to analyze responses of the followers quantified in social media metrics, such as "likes", "shares", "comments" (positive), and data indicating an impact to sales within a time range of the posting by the influencer.

Embodiments of the present invention utilize the machine learning results to generate a corpus of influencers that includes data correlating the respective influencers to product types, followers, and effectiveness of influence. In some embodiments, unsupervised machine learning may be used to cluster online influencers, and supervised machine learning may be applied to reduce clusters to specific instances of product-type expertise and experience, ranges of influence effectiveness, location of influencers, and engagement level of an influencer with followers. Herein, influencers are described as posting content and reviews on social media platforms, for purposes of simplicity and clarity, however, embodiments of the present invention recognize that online influencers may use e-commerce platforms, social media platforms, or other online platforms to communicate content to followers and interested parties.

In some embodiments of the present invention, a product return is requested by a customer that includes the product's current location, information details about the product, and the product's condition. An influencer is selected from the corpus of influencers, based on aligning the product information and location with the product type, area of expertise and experience, and location of the influencer. Receiving acceptance of terms of the agreement by the selected influencer triggers the generation of return destination information used to print a delivery label for the packaged product being returned by the customer or by an authorized retailer. In an example embodiment, the return destination information is sent to the customer requesting the product return, enabling the printing of the delivery label that includes the influencer destination information for the product return. In some embodiments, the influencer destination information may include coded information, which is decipherable by the delivery service and protects the address location of the influencer. In other embodiments, the influencer may have designated a particular drop-off address for delivery of returns that is separate from the influencer's address, such as a third-party address or held for pickup at a post office.

Embodiments of the present invention include terms of an agreement between the selling business and the selected influencer. The terms of the agreement include specific activities to be performed by the influencer upon receipt of the returned product, which may include providing a product review or demonstration and posting the result to the influencer's social media platform. Embodiments of the present invention acknowledge that reviews of products performed by influencers include activity and commentary that describes the product, use of the product, and assessment by the influencer of how well the product performs against claims made by the manufacturer. In some embodiments, a review of the product may include demonstration of product use, assessment of quality and durability, techniques of product use, caution and safety advice, and may compare the product to similar product items. In some embodiments of the present invention, the influencer publishes the review, often referred to as "posting" the review, to an online social media platform to be consumed by followers and interested users. Followers and interested users may respond to the posted review by commenting, indicating positive reaction as "likes" and may share the link to the posting with others.

In some embodiments, the terms of the agreement include details of the compensation the influencer receives from completing the posting of the product review. In one embodiment, the compensation may stipulate that the influencer is entitled to keep possession of the product after completing and posting a review of the product. In other embodiments, the influencer may be paid for providing the review but must return the product to the selling business. In yet other embodiments, the compensation to the influencer may be in the form of the reduced cost of the return product if the influencer wishes to purchase the product, or the compensation may provide for discounts on a range of products offered by the selling company. In some embodiments, the influencer is required to provide verification that the product review has been completed in compliance with the terms of the agreement and has been posted to the social media platform. An example of the influencer meeting verification requirements may include tagging the selling business within the posted review or providing the selling business a link to the posted review.

Embodiments of the present invention include receiving consent to collect and use data associated with postings by influencers and include confirmation of anonymization of the data, which is kept private and protected and used for purposes of generating product promotion opportunities from product returns. E-commerce businesses benefit from low-cost opportunities for promotion of products to a loyal audience that has a level of trust in the influencer and avoids full costs of handling returns.

Figure 1:
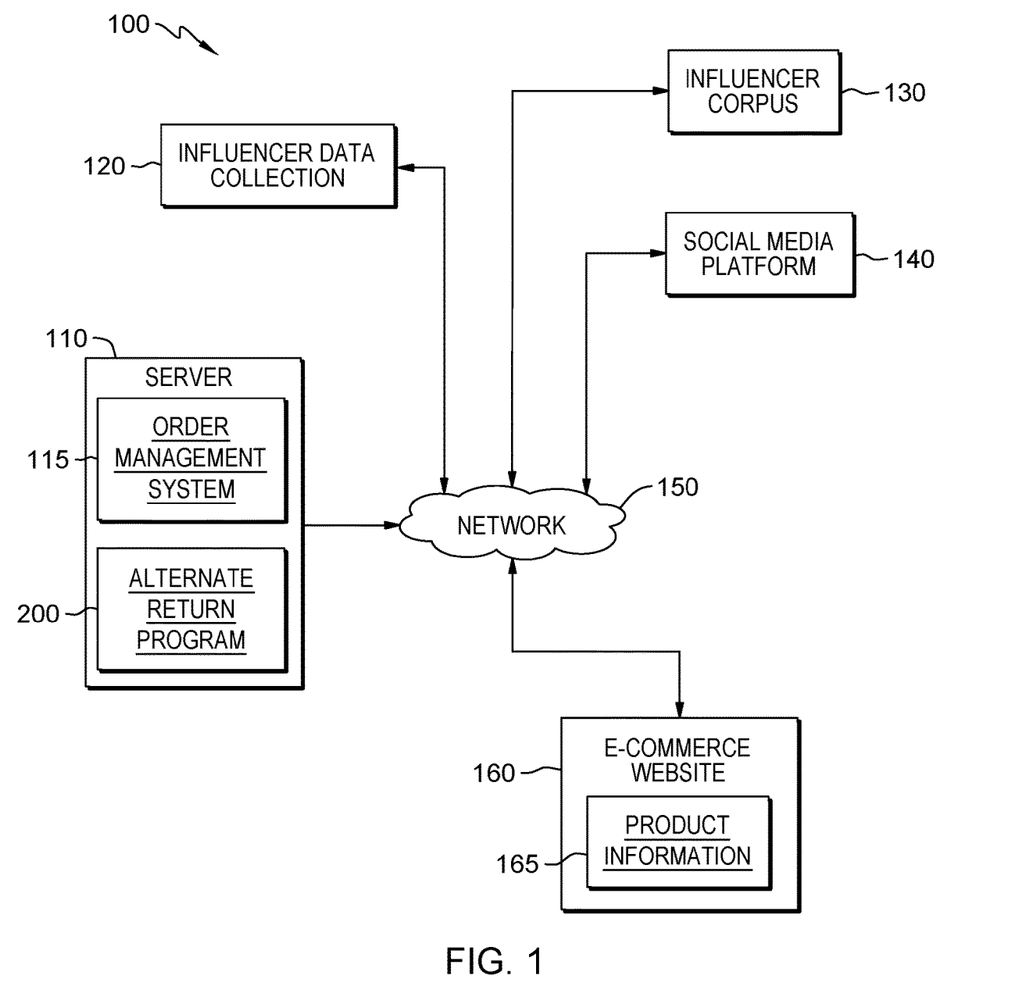
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, influencer data collection 120, influencer corpus 130, social media platform 140, and e-commerce website 160, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between server 110, influencer data collection 120, influencer corpus 130, social media platform 140, and e-commerce website 160.

Server 110 includes order management system 115 and alternate return program 200. In some embodiments, server 110 can be a blade server, a web server, a laptop computer, a desktop computer, a standalone mobile computing device, a smartphone, a tablet computer, or another electronic device or computing system capable of receiving, sending, and processing data. In other embodiments, server 110 may be a computing device interacting with applications and services hosted and operating in a cloud computing environment. In another embodiment, server 110 can be a netbook computer, a personal digital assistant (PDA), or other programmable electronic devices capable of generating and transmitting input to and receiving programming instructions from order management system 115 and alternate return program 200. Alternatively, in some embodiments, server 110 may be communicatively connected to alternate return program 200 operating remotely. Server 110 may include internal and external hardware components, depicted in more detail in FIG. 3.

Order management system 115 is a retail business application for order management, handling functions of customer orders, tracking orders, and provides information on order fulfillment. Order management system 115 provides convenience and flexibility of customer ordering and options supporting pickup or delivery, as well as handling exchanges and returns for e-commerce businesses, such as the e-commerce business supporting e-commerce website 160. In some embodiments, order management system 115 communicates with alternate return program 200, residing on server 110 as a separate service that provides an opportunity for low-cost product promotion from product returns. In other embodiments, order management system 115 includes alternate return program 200 as a component module (not shown), providing an optional process to standard product returns in which product returns are routed to a selected influencer for a product promotional opportunity.

Alternate return program 200 is an application for alternatively routing a product return to a selected social media influencer to perform and post a review of the product returned by a customer on a social media platform. Alternate return program 200 is triggered by a received request from a customer to return a product purchased online, such as from e-commerce website 160. Alternate return program 200 identifies the product from the return request and obtains other product return information, such as the usage, condition, and location of the product. Alternate return program 200 accesses additional information regarding the product for return from product information 165 and searches influencer corpus 130 to identify one or more influencers that have the experience, expertise, location, and following audience optimal for reviewing the product being returned.

Alternate return program 200 provides terms of the agreement to the selected influencer and responsive to acceptance by the influencer, alternate return program 200 generates delivery information associated with delivery to the influencer. In the case in which the influencer does not agree to the terms of the agreement, alternate return program 200 searches influencer corpus 130 and selects the next most optimal influencer, and sends terms of the agreement. In some embodiments, alternate return program 200 generates delivery information that includes coded information that is decipherable by the delivery service, protecting the physical location of the influencer. In other embodiments, alternate return program 200 generates delivery information of a third party or a drop-off location designated by the influencer.

Alternate return program 200 sends the delivery information to the customer returning the product, and the customer prints out the delivery information and attaches the delivery information to the packaged product for delivery to the influencer. Alternate return program 200 receives validation from the influencer subsequent to the influencer completing agreed-to activities from the terms of the agreement. In some embodiments, alternate return program 200 obtains metrics associated with the review published by the influencer, including information associated with sales of the product. Alternate return program 200 updates data associated with the review performed by the selected influencer in influencer corpus 130.

Influencer data collection 120 is a repository of data associated with social media influencers resulting from scanning, data from online posting, and publication sites. In some embodiments, influencer data collection 120 collects data from the identified online posting sites that includes identification of the author as a potential influencer, subject matter posted by the potential influencer, social media metrics such as followers, likes, comments, and shares associated with postings on the social media site.

Influencer data collection 120 provides a data set to be applied to a machine learning model that clusters the collected subject matter data into product types, brands, and other product-related categories. Additional machine learning techniques, such as applying supervised learning to influencer data collection 120 results in detailed influencer data that is added to influencer corpus 130. The detailed influencer data may include associating specific products to the corresponding influencer and include a number of followers, and indicators of trust and loyalty from follower responses. In some embodiments, comments may also indicate a level of engagement or interaction of the influencer with a smaller size group of followers.

Influencer corpus 130 is a repository of identified influencers received from analysis and machine learning activity that associates the areas of expertise and experience with the identified influencer. Influencer corpus 130 includes searchable data associated with the influencer, such as product types, brands, and followers related to postings and publications performed by the influencer. Influencer corpus 130 includes physical location information of the respective influencers and is updated by alternate return program 200 subsequent to validated reviews performed by the respective influencers.

In embodiments of the present invention, influencer corpus 130 includes confirmation of the respective influencer's consent to obtain and store information associated with the influencer. In some embodiments, influencer corpus 130 indicates the preferred delivery information for respective influencers, which may be provided in coded information or may designate a third-party or alternate pickup location. In some embodiments, influencer corpus 130 includes information regarding compensation to the respective influencers for receiving a returned product and performing requested activity associated with the product, such as a review of the product, a demonstration using the product, comparisons with other products, or simply an image associating the influencer with the product. Influencer compensation may include, but is not limited to, allowing the influencer to keep the product without charge, offering the product to the influencer at a discounted price, providing monetary payment to the influencer, or offering the influencer discounted purchasing of other products provided by the product's e-commerce business.

In embodiments of the present invention, the specifically requested activity to be performed by the influencer, the compensation, the product in question, and additional stipulations, such as whether the product is to be returned to the selling e-commerce business, are included in a "terms and agreements" document sent to the selected influencer. The terms and agreements document may include standard terms or may be customized based on the product, the influencer, or other considerations. Embodiments of the present invention depend upon confirmation of the influencer accepting the terms and agreements prior to the subsequent activity of routing the product to a destination designated by the influencer.

Social media platform 140 represents an online social media provider utilized by the influencer to post information to followers of the influencer and other interested users. In some embodiments, social media platform enables the influencer to publish one or a combination of text, images, video, audio, and additional links in providing communication and information about a particular area of interest to a plurality of followers, that elect to receive notification of postings and publications by the influencer. In some embodiments, the influencer may post information on social media platform 140 as a blog, a forum, or as a website utilizing subscription or membership.

E-commerce website 160 is depicted as including product information 165. E-commerce website 160 is a collection of webpages of an e-commerce business selling products online. E-commerce website 160 offers online purchasing of products for users and is communicatively connected to order management system 115. Data from user purchases and other transactions are transmitted to order management system 115 via network 150. In some embodiments, e-commerce website 160 provides access for the user to initiate a product return process. In some embodiments, an initiated product return process triggers alternate return program 200, which receives information about the product to be returned, the location of the user, the condition of the product, and may include other information regarding the purchase transaction.

Product information 165 includes detailed information regarding products sold on e-commerce website 160. In some embodiments, product information 165 includes product description, product specifications, which may include dimensions, size, color, materials, power rating, and performance metrics, among other details. Product information 165 is accessed by alternate return program 200, subsequent to receiving information requesting a product return, to obtain product information that is utilized in searching influencer corpus 130 for optimal influencer selection.

Figure 2:
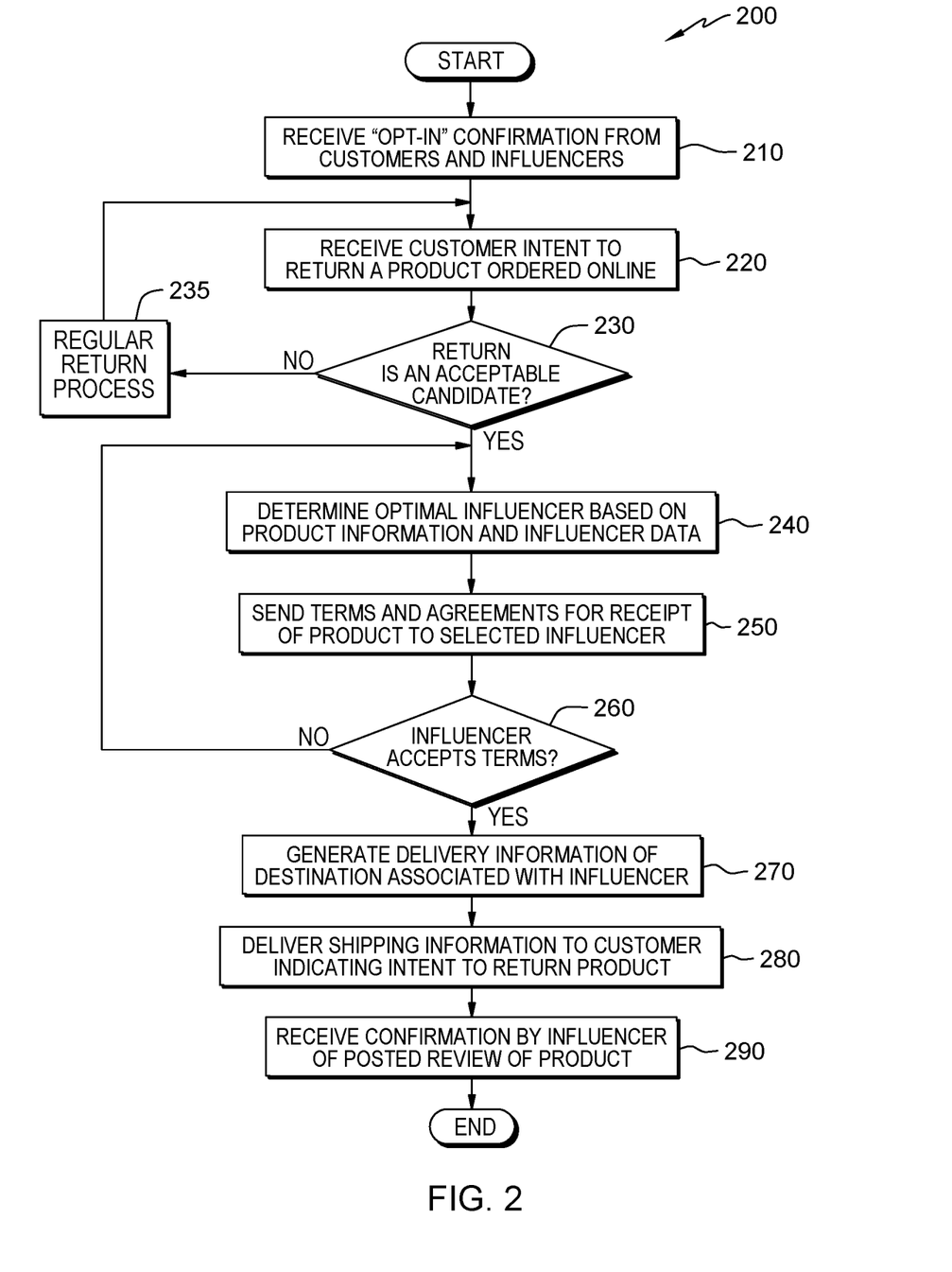
FIG. 2 is a flowchart depicting the operational steps of an alternate return program operating in the distributed data processing environment of FIG. 1, in accordance with embodiments of the present invention.

FIG. 2 is a flowchart depicting the operational steps of alternate return program 200 operating in the distributed data processing environment of FIG. 1, in accordance with embodiments of the present invention. The product that is indicated by a customer to be returned or requesting a return is referred to, herein, as a/the return product or product return. Alternate return program 200 utilizes data collected from online authors of blogs, forums, information websites, and content contributors, such as influencer data collection 120 (FIG. 1). The collected data is applied to a machine learning model, which clusters data associated with the authors, also referred to herein as influencers, and further refines the data to associate areas of expertise and experience as well as product types to respective influencers. The output of the machine learning model is a collection of influencers, such as influencer corpus 130, form which alternate return program 200 selects an optimal influencer match to a product designated for return.

In some embodiments, the machine learning model may be a component module of alternate return program 200 (not shown), that generates a corpus of influencers and corresponding data. In other embodiments, the machine learning model may reside remotely and generate a corpus of influencers communicatively connected to alternate return program 200.

Alternate return program 200 receives an "opt-in" confirmation from users participating in influencer promotion opportunities from returned products (step 210). Alternate return program 200 receives a consent indicating an "opt-in" decision by influencers participating in embodiments of the present invention applied to electronic commerce. In embodiments, the influencers receive confirmation that all user data is private and protected (other than influencers' postings) and that user data is anonymized for personal privacy.

Alternate return program 200 receives a customer's intent to return a product ordered online (step 220). Alternate return program 200 is communicatively connected to the e-commerce business from which the customer ordered a product that the customer wishes to return. Alternate return program 200 receives the information associated with the return of the product provided by the customer, which includes product identification, product condition, location of the product, and reason for return.

For example, alternate return program 200 receives the notification of a product return that was requested by user A. The notification of the product return includes information identifying the product to be eye makeup, with a description, a location of user A, and the condition of the makeup as "unused", with a reason for return as "the wrong color was delivered".

Alternate return program 200 determines if the product return is an acceptable candidate for online review (decision step 230). Alternate return program 200 considers the type of product and the condition of the product to determine whether the product being returned is an acceptable candidate for online promotion by the influencer. Alternate return program 200 determines that return product conditions may not be acceptable for use in re-routing the return to an influencer for an additional promotional opportunity to a number of followers of the influencer.

Unacceptable return product conditions may include, for example, broken-as-received, significantly used, products that are partially consumed or have a temporal expiration. For the case in which alternate return program 200 determines that the return product is not acceptable as a candidate for an opportunity for product review by an influencer (step 230, "NO" branch), alternate return program 200 designates the return product to follow the regular return process (step 235) and waits to receive a subsequent customer intent to return a product (return to step 220).

For example, if alternate return program 200 determines that the product to be returned is an electronic device that is broken, a consumable item that has been sampled, a clothing article that is soiled or torn, for example, then alternate return program 200 determines that the product return is not an acceptable item for alternatively sending to an online influencer, and allows the return to proceed to the e-commerce business, following a normal return process.

For the case in which alternate return program 200 determines that the product to be returned is an acceptable candidate for online review and promotion (step 230, "YES" branch), alternate return program 200 proceeds to determine an optimal influencer based on product information, and influencer data (step 240). Alternate return program 200 analyzes the information received with the request for return of the product, including the product-related information and the location of the product.

Alternate return program 200 is triggered by a notification of the intent to return a product. In some embodiments, alternate return program 200 automatically accesses a repository of influencer data, such as influencer corpus 130, and searches for an optimal influencer based on, but not limited to, influencer information, such as the location of the influencer, the area of expertise and product experience of the influencer, and the size of the audience of followers of the influencer. Alternate return program 200 prioritizes an influencer located closer to the return product location to minimize shipping costs and may prioritize influencers with a larger following or influencers with a history of high levels of engagement with lower numbers of followers, dependent on the product type of the return product. Alternate return program 200 determines an optimal influencer based on matching information associated with the return product to information associated with the influencer. In some embodiments of the present invention alternate return program 200 performs the access and selection of an influencer without intervention by the e-commerce platform.

For example, alternate return program 200 considers a product type of "makeup" and a detailed attribute of "eye makeup with glitter", and a location of Chicago, Ill. of the user. Alternate return program 200 searches for influencers that have a history of posting information or demonstrations of using, applying, or comparing eye makeup. Alternate return program 200 additionally considers if there are influencers that have a particular history discussing eye makeup with glitter that has delivery information near Chicago. Alternate return program 200 determines an influencer that optimally matches the information comparisons.

Alternate return program 200 sends terms and agreements for the receipt of the return product to the selected influencer (step 250). The terms and conditions sent to the selected influencer are automatically generated by alternate return program 200, and include details of a request to the selected influencer to agree to receive the product being returned and to perform certain activities associated with the product, such as posting a review that details the description, use, and opinion of the product by the influencer, for example. The terms and agreements are predetermined by alternate return program 200 and are tailored to the particular product being returned and selected influencer. In some embodiments of the present invention, the terms and agreements provide details of product qualities and attributes that the influencer is being asked to describe and comment on, as well as whether the posting of the review on a social media platform requires images or video/audio to be included in the posting. In some embodiments, the terms and agreements include details of compensation for the influencer, as well as instructions regarding the post-review fate of the returned product. Alternate return program 200 receives details of terms and agreements from the e-commerce business associated with the sale of the return product.

For example, alternate program 200 automatically sends the selected influencer a set of terms and agreements to be reviewed and accepted or rejected by the influencer. The terms and agreements describe the return product as a selection of eye makeup of a particular color and with glitter, which is unused and returned due to the color being incorrect. The terms and agreements request the influencer to perform and post a video with audio that demonstrates the use and application of the eye makeup, including final images that are posted separately and include a link to enable viewers to order similar eye makeup. The terms and agreements include compensation terms of a cash payment to the influencer, and the influencer may keep the returned product. The terms and agreements require the influencer to provide the e-commerce business with a validation (link) of the posting when complete, and payment will be sent upon receipt of the validation.

Alternate return program 200 determines whether the influencer accepts the terms and agreements (decision step 260). For the case in which alternate return program 200 determines that the influencer does not accept the terms and agreements (step 260, "NO" branch), alternate return program 200 returns to step 240 and searches for the next-optimal influencer from an influencer corpus and proceeds as described above.

For the case in which alternate return program 200 determines that the influencer accepts the terms and agreements (step 260, "YES" branch), alternate return program 200 generates delivery information of a destination associated with the influencer (step 270). In some embodiments, the shipping information of the destination associated with the selected influencer may be a coded address, which protects the physical location of the influencer, but which can be deciphered by pre-arrangement with the delivery service provider. In other embodiments, the influencer may have indicated a delivery destination of a trusted third party or a secure pickup location other than the physical location of the influencer. Alternate return program 200 generates the delivery information from data included in a profile of information of the influencer included in the repository of influencers, such as influencer corpus 130. In other embodiments, the delivery information associated with the influencer is included in a reply message from the influencer accepting the terms and agreements of the return product review.

For example, subsequent to receiving acceptance of the terms and agreements, alternate return program 200 accesses influencer corpus 130 and retrieves the designated delivery destination information for the selected influencer. Alternate return program 200 generates an electronic digitized copy of the delivery information.

Alternate return program 200 sends the delivery destination information to the customer or entity in possession of the product to be returned (step 280). In some embodiments of the present invention, alternate return program 200 sends the delivery destination information of the influencer to the customer returning the product in an email. In another embodiment, the delivery destination information is retrieved by the customer by a download of the information from the e-commerce website. In yet another embodiment, the product is delivered to a third party that processes the return intent, once in possession of the product (e.g., return of product to mortar and brick store for an online purchase). In some embodiments, the delivery destination information of the selected influencer is in a format to print out as a shipping label.

For example, alternate return program 200 sends an email that includes the information for delivery of the return product. The email includes a formatted file that is printed out as a shipping label that the customer attaches to the package containing the return product. The return product package is delivered to the delivery destination designated by the influencer instead of being sent to a regular return process destination.

Alternate return program 200 receives confirmation by the influencer of the posted review of the return product (step 290). In some embodiments of the present invention, alternate return program 200 receives a link to the social media platform containing the posted review performed by the selected influencer. In some embodiments, alternate return program 200 may search the posting to determine if the terms and agreements to which the influencer consented are met. In other embodiments, a user from the e-commerce business may receive a link to the posting, confirm the contents meet the terms and agreements, and input a confirmation to alternate return program 200. In yet other embodiments, alternate return program 200 receives a notification of a tag included in the posting of the review by the influencer, and follows the tag link, searches the posting, and determines if the terms and agreements are met.

Having confirmed that the terms and agreements are fulfilled by the influencer's posted review, alternate return program 200 ends.

For additional clarity of the features of embodiments of the present invention, an additional example use case is included:

Ashley loves being a micro-influencer within the product area of makeup, but she knows that make-up is expensive to just go out and buy all the time. Ashley is trying to find a way to get free products or samples that she can use for her product review videos. She would love to participate in this program where she receives random types of makeup that other people wanted to return, typically because they bought it online and couldn't tell what the color was until they received a box in the mail. Ashley signs up (opts-in) for the alternate return option offered by a manufacturing company of makeup. Ashley receives two to three new packages a week and each weekend she tries all the makeup and then creates vlogs about the product and how she likes to use it and includes images as stipulated in the terms and agreements document she agreed to.

Ashley is very talented with makeup and entertaining to watch, so her social media account is growing with 88,935+ users on her social media account. She interacts with her audience via comments and questions, so her vlog is highly interactive with fresh makeup content and current reviews every week. Once Ashley has posted a review or information about the makeup products, the products do not have to be returned to the manufacturer, as stated in the terms and agreements document, so she keeps the products she likes. (Note: a vlog is designed to share experiences, thoughts, and ideas with an online audience, and is a form of communication used to engage an online audience in a more direct and personal manner).

Figure 3:
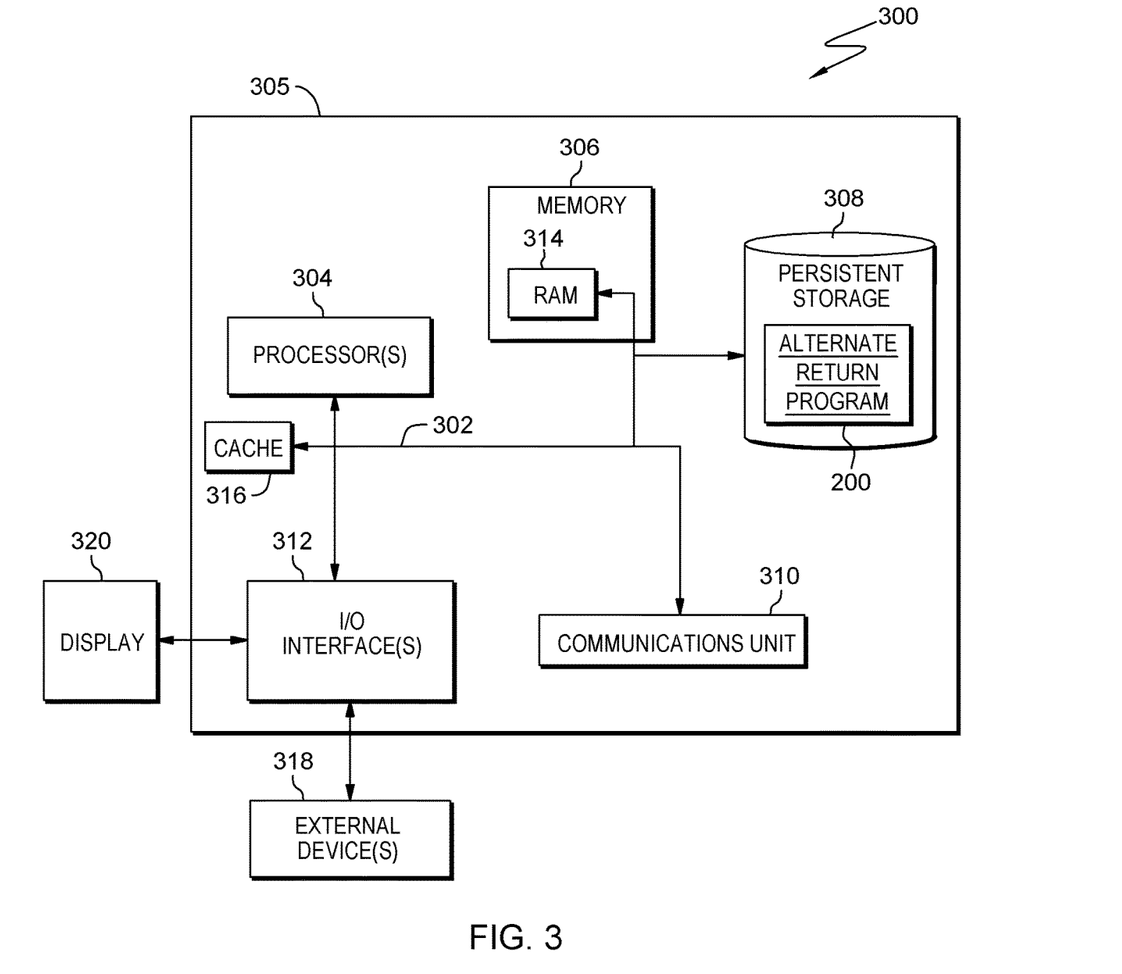
FIG. 3 depicts a block diagram of components of a computing system, including a computing device configured to operationally perform the alternate return program of FIG. 2, in accordance with an embodiment of the present invention.

FIG. 3 depicts a block diagram of components of computing system 300, including computing device 305, configured to include or operationally connect to components depicted in FIG. 1, and with the capability to operationally perform alternate return program 200 of FIG. 2, in accordance with an embodiment of the present invention.

Computing device 305 includes components and functional capability similar to components of server 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, alternate return program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Alternate return program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., alternate return program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for re-directing a product return, the method comprising:

receiving, by one or more processors, a request for a return of a product ordered online from a user in possession of the product, including information about the product;

generating, by the one or more processors, a corpus of social media influencers based on data collected from online authors of posted product information;

searching for social media influencers from the corpus of social media influencers, wherein information associated with the social media influencers includes location, subject matter of reviews, number of followers, and comments and responses by followers;

selecting, by the one or more processors, a first social media influencer, by utilizing results from a machine learning model analyzing and categorizing the social media influencers, based on the information about the product, a location of the user in possession of the product, and the information from the search for social media influencers;

determining, by the one or more processors, the first social media influencer receives the product for return, performs activities associated with the product, and posts a review of the product on a social media platform;

generating, by the one or more processors, an electronic digitized copy of a printable shipping label that includes delivery information designated by the first social media influencer; and sending, by the one or more processors, in an online communication the electronic digitized copy of the printable shipping label that includes the delivery information of the first social media influencer to the user in possession of the product.

2. The method of claim 1, further comprising:
formatting, by the one or more processors, the delivery information associated with the first social media influencer enabling printing of the delivery information as a shipping label.

3. The method of claim 1, wherein the information about the product includes product identification, product specifications, product purchase information, product usage, product location, and a current condition of the product.

4. The method of claim 1, wherein the information associated with the selected first social media influencer from an corpus of social media influencers, further comprises:
identification of the respective social media influencer;
an area of expertise of the respective social media influencer; and
a location of the respective social media influencer.

5. The method of claim 4, wherein the information associated with the selected first social media influencer from an corpus of social media influencers, further comprises one or a combination from the group consisting of:
a product-type and brand experience of the respective social media influencer;
a number of online followers of the respective social media influencer;
a response metric of followers of the respective social media influencer;
demographic information of the respective social media influencer;
prior purchase history of the respective social media influencer; and
an engagement indicator of the respective social media influencer.

6. The method of claim 1, further comprising:
receiving, by the one or more processors, a consent by a respective social media user of a plurality of social media users that post or publish information and opinion to collect information associated with the respective social media user; and
determining, by the one or more processors, whether a first social media user of the plurality of social media users is an influencer, by applying machine learning clustering techniques to the collected information and content authored online by the respective social media user for public viewing.

7. The method of claim 1, wherein the receipt of the product by the first social media influencer includes a description of activity to be performed by the selected social media influencer, compensation for performing the activity, and instructions to confirm the activity has been performed.

8. The method of claim 7, wherein the receipt of the product by the first social media influencer includes instruction for performing the activity, and consent to keep the product intended to be returned.

9. The method of claim 1, wherein the receipt of the product by the first social media influencer includes instructions of dispositioning of the product subsequent to the selected social media influencer performing a requested activity.

10. A computer program product for re-directing a product return, the computer program product comprising:
one or more computer-readable storage media, and program instructions stored on the one or more computer-readable storage media, the program instructions comprising:
program instructions to receive a request for a return of a product ordered online from an online transaction from a user in possession of the product, including information about the product;
program instructions to generate a corpus of social media influencers based on data collected from online authors of posted product information;
program instructions to search for social media influencers from the corpus of social media influencers, wherein information associated with the social media influencers includes location, subject matter of reviews, number of followers, and comments and responses by followers;
program instructions to select a first social media influencer by utilizing results from a machine learning model analyzing and categorizing the social media influencers, based on the information about the product, a location of the user in possession of the product, and the information from the search for social media influencers;
program instructions to determine the first social media influencer receives the product for return, performs activities associated with the product, and posts a review of the product on a social media platform;
program instructions to generate an electronic digitized copy of a printable shipping label that includes delivery information designated by the first social media influencer; and
program instructions to send in an online communication the electronic digitized copy of the printable shipping label that includes the delivery information of the first social media influencer to the user in possession of the product.

11. The computer program product of claim 10, further comprising program instructions, stored on the one or more computer readable storage media, to:
format the delivery information associated with the selected first social media influencer enabling printing of the delivery information as a shipping label.

12. The computer program product of claim 10, wherein the information about the product includes product identification, product specifications, product purchase information, product usage, product location, and a current condition of the product.

13. The computer program product of claim 10, wherein the receipt of the product by the first social media influencer includes receiving a description of activity to be performed by the first social media influencer, disposition of the product to be returned subsequent to performing the activity, and instructions to confirm the activity has been performed.

14. The computer program product of claim 13, wherein the disposition of the product subsequent to performing the activity includes consent to keep the product intended to be returned and agreement to receive and retain additional products for which the activity is to be performed and posted on a social media platform.

15. A computer system for re-directing a product return, the computer system comprising:
one or more computer processors;
at least one computer-readable storage medium, and program instructions stored on the at least one computer-readable storage medium, the program instructions comprising:
program instructions to receive an intent to return a product as a result of an online order from a user in possession of the product, including information about the product;

program instructions to generate a corpus of social media influencers based on data collected from online authors of posted product information;

program instructions to search for social media influencers from the corpus of social media influencers, wherein information associated with the social media influencers includes location, subject matter of reviews, number of followers, and comments and responses by followers;

program instructions to select a first social media influencer by utilizing result from a machine learning model analyzing and categorizing the social media influencers, based on the information about the product, a location of the user in possession of the product, and the information from the search for social media influencers;

program instructions to determine the first social media influencer receiving the product for return, performing activities associated with the product, and posting a review of the product on a social media platform;

program instructions to generate an electronic digitized copy of a printable shipping label that includes delivery information with designated by the first social media influencer; and program instructions to send in an online communication, the electronic digitized copy of the printable shipping label that includes the delivery information of the first social media influencer to the user in possession of the product.

16. The computer system of claim 15, further comprising program instructions, stored on the computer readable storage media for execution by at least one of the one or more processors, to:

format the delivery information associated with the selected social media influencer enabling printing of the electronic digitized copy of the delivery information as a shipping label.

17. The computer program product of claim 15, wherein the information about the product includes product identification, product specifications, product purchase information, product usage, product location, and a current condition of the product.

18. The computer system of claim 15, wherein the receipt of the product by the first social media influencer includes a description of activity to be performed by the selected social media influencer, directions regarding disposition of the product subsequent to performing the activity, and instructions to confirm the activity has been performed, and wherein the disposition of the product subsequent to performing the activity includes, consent to keep the product intended to be returned.

19. The computer system of claim 15, further comprising program instructions, stored on the computer readable storage media for execution by at least one of the one or more processors, to:

receive a consent by a respective social media user of a plurality of social media users that post or publish information and opinion to collect information associated with the respective social media user; and determine whether the respective social media user of the plurality of social media users is an influencer, by applying machine learning clustering techniques to the collected information and content authored online by the respective social media user for public viewing.

20. The computer system of claim 15, wherein the receipt of the product by the selected social media influencer includes instructions of dispositioning of the product subsequent to the selected influencer performing a requested activity.

* * * * *